Aug. 21, 1928.
A. F. SAUNDERS
1,681,598
TEAPOT CONSTRUCTION (POTTERY BODY)
Filed Jan. 27, 1926
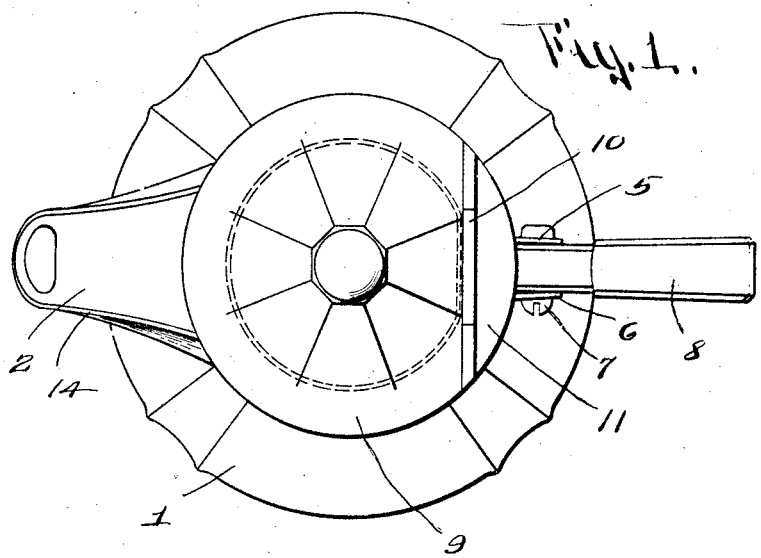
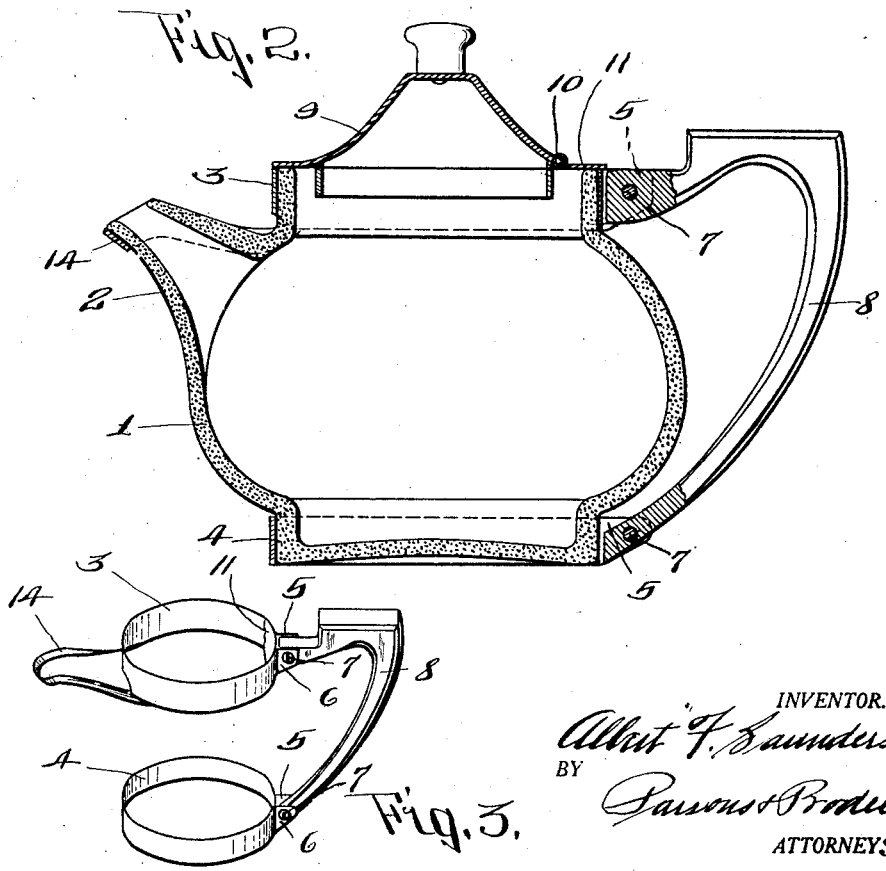
INVENTOR.
Albert F. Saunders
BY
Parsons & Brodell
ATTORNEYS.

Patented Aug. 21, 1928.

1,681,598

UNITED STATES PATENT OFFICE.

ALBERT F. SAUNDERS, OF SYRACUSE, NEW YORK, ASSIGNOR TO T. N. BENEDICT MFG. CO., OF EAST SYRACUSE, NEW YORK, A CORPORATION OF NEW YORK.

TEAPOT CONSTRUCTION (POTTERY BODY).

Application filed January 27, 1926. Serial No. 83,991.

This invention relates to tea pots and similar articles and has for its object a particularly simple and efficient frame for china or earthen ware, which protects the earthen or china pot from chipping and also which is readily applied to any pot so that when the china or earthen ware pot is broken the frame can be applied to another similar pot.

The invention consists in the novel features and in the combinations and constructions hereinafter set forth and claimed.

In describing this invention reference is had to the accompanying drawings in which like characters represent corresponding parts in all the views.

Figure 1 is a plan view of a tea pot embodying my invention.

Figure 2 is a vertical sectional view taken on line 2—2, Fig. 1.

Figure 3 is a perspective detail view of the metal frame thereof.

This tea pot or similar article comprises a pottery body, that is a body composed of earthen ware or china, a metal frame detachably secured to the body and so arranged as to protect the exposed edges and corners of the body of the pot, a metal handle carried by the frame, a cover for the pot also carried by the frame, and further in case the article is provided with a spout, a shield or protector skirting the spout to guard it against chipping.

1 designates the body of the pot, that here shown being bulged outwardly between its ends, which ends are formed cylindrical.

2 is the spout projecting from the body, as the article here illustrated is a tea pot, although this invention is applicable to other articles not having spouts as sugar bowls. The metal frame for the pottery body comprises upper and lower bands 3—4 fitting the cylindrical end portions of the pottery body, and skirting the upper and lower exposed margins and corners of the body. These bands have outturned ends 5—6, through which screws 7 are passed to clamp the bands in position. The screws also serve as bearings for the ends of a handle 8, which extend between the lugs of the bands.

9 is the cover for the pot, it being hinged at 10 to a segmental top plate 11 secured to the upper edge of the top band, the cover resting on the upper edges of the top band 3. The cover also has a flange set in from its edge, which flange telescopes into the neck of the pottery body.

14 is a shield skirting the spout and protecting its exposed edges from chipping, this shield being secured at its opposite ends to the upper band.

Tea, coffee and other beverages are more inviting and satisfactory when served in an earthen or china pot, also the earthen or china pot is more sanitary. Earthen or china ware pots quickly become chipped or broken, and the replacement cost is comparatively high. By this metal frame for earthen ware pots all the advantages of the earthen ware pot are retained, while the exposed parts are protected against chipping during the handling and washing of the article, also owing to the arrangement of the handle, it remains comparatively cool as the heat does not readily radiate to the handle from the earthen or china pot.

What I claim is:—

1. A construction for tea pots and similar articles comprising a body of pottery or the like, a metal frame including spaced apart metal bands enclosing the top and bottom rim portions of the body, a handle having its ends secured to the bands and a cover carried by the upper band.

2. A construction for tea pots and similar articles comprising a body of pottery or the like comprising upper and lower metal bands enclosing the upper and lower rim portions of the body, a handle connected at its ends to said band and a shield for the spout of the body, said shield projecting from the upper band.

3. A construction for tea pots and similar articles comprising a body of pottery or the like comprising upper and lower metal bands enclosing the upper and lower rim portions of the body, a handle connected at its ends to said band and a shield for the spout of the body, said shield projecting from the upper band, and a cover for the body carried by the upper band.

4. A tea pot and the like comprising a body and a metal frame comprising rings embracing the pottery body and enclosing the exposed corners of the pottery body, a shield skirting the exposed edges of the spout and a handle carried by said parts, and a cover carried by one of said parts.

In testimony whereof I have hereunto signed my name at Syracuse, in the county of Onondaga and State of New York, this 25th day of January, 1926.

ALBERT F. SAUNDERS.